US012644408B2

(12) United States Patent
Durocher

(10) Patent No.: US 12,644,408 B2
(45) Date of Patent: Jun. 2, 2026

(54) POWERPLANT FUEL SYSTEM UTILIZING AMMONIA

(71) Applicant: Pratt & Whitney Canada Corp., Longueuil (CA)

(72) Inventor: Eric S. Durocher, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/759,219

(22) Filed: Jun. 28, 2024

(65) Prior Publication Data

US 2026/0002466 A1 Jan. 1, 2026

(51) Int. Cl.
| | |
|---|---|
| *F02C 3/24* | (2006.01) |
| *F02C 3/20* | (2006.01) |
| *F02C 7/224* | (2006.01) |
| *F23R 3/36* | (2006.01) |
| *F02C 3/22* | (2006.01) |

(52) U.S. Cl.
CPC .............. *F02C 3/24* (2013.01); *F02C 7/224* (2013.01); *F02C 3/20* (2013.01); *F02C 3/22* (2013.01); *F23R 3/36* (2013.01)

(58) Field of Classification Search
None
See application file for complete search history.

(56) References Cited

U.S. PATENT DOCUMENTS

| | | |
|---|---|---|
| 11,920,524 B2 | 3/2024 | Smith |
| 2021/0332759 A1 | 10/2021 | Smith |

| | | | |
|---|---|---|---|
| 2022/0162989 A1 | 5/2022 | Cocks | |
| 2022/0162999 A1* | 5/2022 | Cocks | .................... C01B 3/047 |
| 2023/0194097 A1 | 6/2023 | Hart | |
| 2023/0258128 A1 | 8/2023 | Lee | |
| 2023/0258135 A1 | 8/2023 | Swann | |
| 2023/0258136 A1 | 8/2023 | Swann | |
| 2023/0258137 A1 | 8/2023 | Swann | |
| 2024/0011417 A1* | 1/2024 | Sibbach | ................. F01D 21/12 |

(Continued)

FOREIGN PATENT DOCUMENTS

| | | |
|---|---|---|
| CN | 107882638 B | 6/2020 |
| CN | 115387914 A | 11/2022 |

(Continued)

OTHER PUBLICATIONS

EP Search Report for EP Patent Application No. 25186368.4 dated Nov. 18, 2025.

*Primary Examiner* — Lorne E Meade
*Assistant Examiner* — Alyson Joan Harrington
(74) *Attorney, Agent, or Firm* — Getz Balich LLC

(57) ABSTRACT

A fuel system includes a reservoir, a heat exchanger, a heating device, a cracker and a fuel injector. The heat exchanger is configured to vaporize a first flow of liquid ammonia received from the reservoir into ammonia gas using heat energy. The heat exchanger is configured to receive the heat energy from the heating device during a first operating mode. The heat exchanger is configured to receive the heat energy from a turbine engine a second operating mode. The cracker configured to at least partially crack the ammonia gas into hydrogen gas and nitrogen gas. The fuel system is configured to deliver the hydrogen gas or a combination of the hydrogen gas and the nitrogen gas to a fuel injector for injection into a combustion chamber.

12 Claims, 4 Drawing Sheets

(56)     References Cited

U.S. PATENT DOCUMENTS

2024/0093639  A1*   3/2024   Ikeda  ........................ F02C 3/22
2024/0102657  A1     3/2024   Kapat
2024/0310042  A1*   9/2024   Smith  ..................... F02C 7/222
2024/0401520  A1*  12/2024   Bak  ........................... F02G 5/04

FOREIGN PATENT DOCUMENTS

CN        117365739  A      1/2024
CN        117404185  A      1/2024
EP          3517757  A1     7/2019
GB          1534891  A     12/1978
WO       2023281265  A1     1/2023

* cited by examiner

POWERPLANT FUEL SYSTEM UTILIZING AMMONIA

TECHNICAL FIELD

This disclosure relates generally to a powerplant and, more particularly, to a fuel system for the powerplant utilizing ammonia.

BACKGROUND INFORMATION

Various fuel systems are known in the art for powerplants such as gas turbine engines, including fuel systems which utilize a non-hydrocarbon fuel such as ammonia. While these known fuel systems have various advantages, there is still room in the art for improvement.

SUMMARY

According to an aspect of the present disclosure, a powerplant is provided that includes a turbine engine and a fuel system. The turbine engine includes a flowpath, a compressor section, a combustor section and a turbine section. The flowpath extends through the compressor section, the combustor section and the turbine section from an inlet into the flowpath to an exhaust from the flowpath. The combustor section includes a combustor with a combustion chamber. The fuel system includes a reservoir, a heat exchanger, a heating device, a cracker and a fuel injector. The heat exchanger is configured to vaporize a first flow of liquid ammonia received from the reservoir into ammonia gas using heat energy. The heat exchanger is configured to receive the heat energy from the heating device during a first operating mode. The heat exchanger is configured to receive the heat energy from the turbine engine a second operating mode. The cracker configured to at least partially crack the ammonia gas into hydrogen gas and nitrogen gas. The fuel system is configured to deliver the hydrogen gas or a combination of the hydrogen gas and the nitrogen gas to the fuel injector for injection into the combustion chamber.

According to another aspect of the present disclosure, another powerplant is provided that includes an aircraft engine and a fuel system. The fuel system includes a reservoir, a heat exchanger, a heating device, a cracker and a fuel injector. The heat exchanger is configured to vaporize a first flow of liquid ammonia received from the reservoir into ammonia gas using heat energy. The heating device is configured to generate the heat energy during initial startup operation of the aircraft engine. The aircraft engine is configured to generate the heat energy during post-startup operation of the aircraft engine. The cracker is configured to at least partially crack the ammonia gas into hydrogen gas and nitrogen gas. The fuel system is configured to deliver the hydrogen gas or a combination of the hydrogen gas and the nitrogen gas to the fuel injector for injection into an internal volume of the aircraft engine for combustion.

According to still another aspect of the present disclosure, a method is provided for operating a powerplant. During this method, a flow of ammonia is heated using heat energy during initial startup operation and post-startup operation of a turbine engine to provide heated ammonia. The heat energy is received from a heating device during the initial startup operation of the turbine engine. The heat energy is received from the turbine engine during the post-startup operation of the turbine engine. The heated ammonia is at least partially cracked into hydrogen gas and nitrogen gas. A non-hydrocarbon fuel is delivered to the turbine engine for combustion within a combustion chamber of the turbine engine during the initial startup operation and the post-startup operation of the during engine. The non-hydrocarbon fuel is or otherwise includes the hydrogen gas or a combination of the hydrogen gas and the nitrogen gas.

The heating device may be configured as or otherwise include an electric heating device.

The heating device may be configured to burn fuel to generate the heat energy during the first operating mode.

The fuel may be a hydrocarbon fuel.

The fuel may be a non-hydrocarbon fuel.

The fuel may be or otherwise include a second flow of the liquid ammonia received from the reservoir.

The heating device may be thermally coupled to the heat exchanger through a first heat transfer fluid.

The first heat transfer fluid may be or otherwise include a heat transfer liquid.

The turbine engine may be thermally coupled to the heat exchanger through a second heat transfer fluid that is different than the first heat transfer fluid.

The turbine engine may be thermally coupled to the heat exchanger through the first heat transfer fluid.

The turbine engine may be thermally coupled to the heat exchanger through a heat transfer fluid. The powerplant may also include a control valve configured to: open to flow the heat transfer fluid from the turbine engine to the heat exchanger; and close to cutoff the flow of the heat transfer fluid from the turbine engine to the heat exchanger.

The heating device may be integrated with the heat exchanger.

The fuel system may also include a first separator configured to separate uncracked ammonia from the hydrogen gas downstream of the cracker.

The fuel system may also include a second separator configured to separate the uncracked ammonia from the nitrogen gas downstream of the first separator.

The fuel system may also include a compressor configured to compress the hydrogen gas and/or the nitrogen gas delivered to the fuel injector.

The first operating mode may be associated with initial startup operation of the turbine engine. The second operating mode may be associated with post-startup operation of the turbine engine.

The fuel system may be configured to deliver the hydrogen gas to the fuel injector for injection into the combustion chamber.

The fuel system may be configured to deliver the combination of the hydrogen gas and the nitrogen gas to the fuel injector for injection into the combustion chamber.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
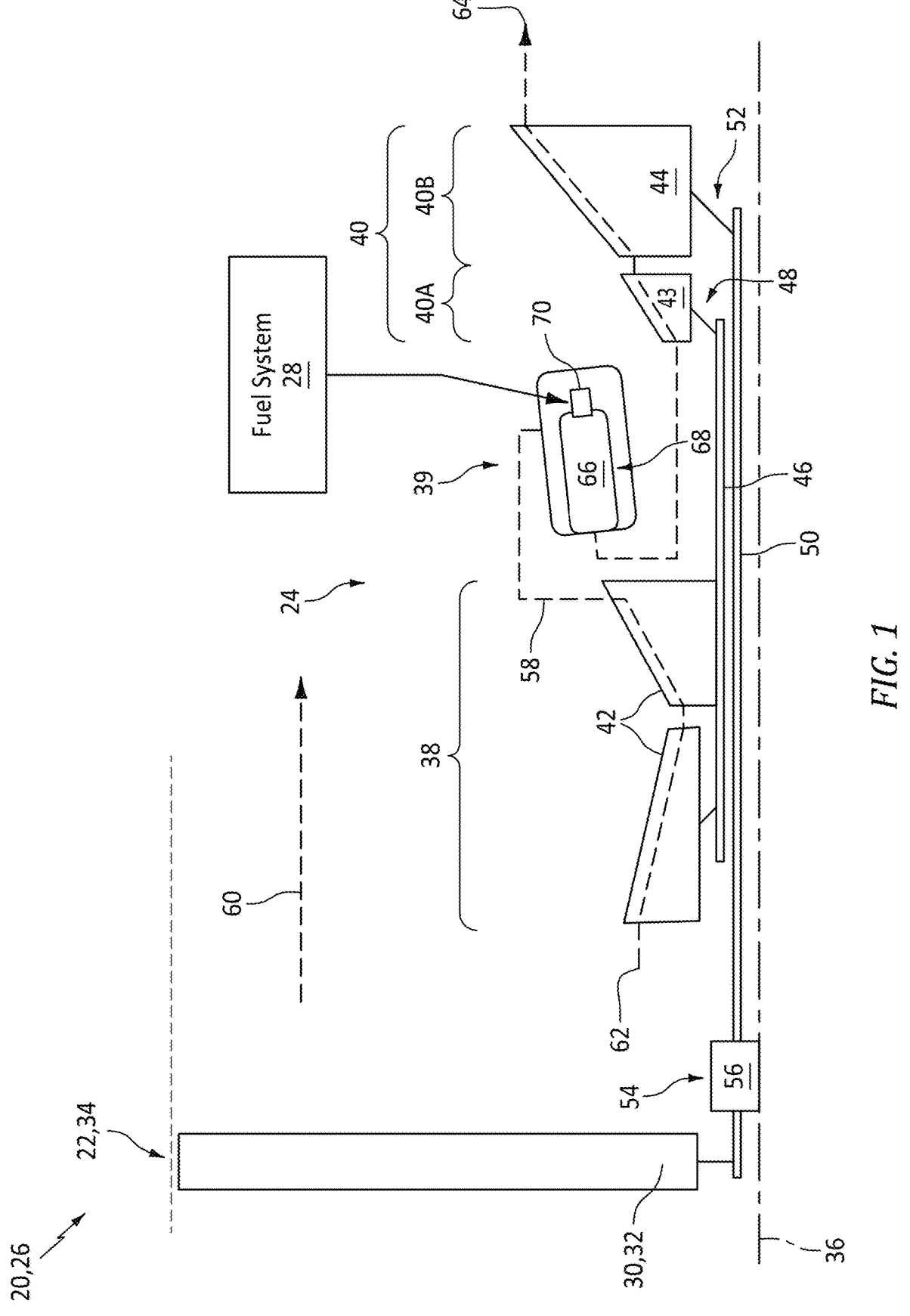
FIG. 1 is a partial schematic illustration of a powerplant for an aircraft.

FIG. 1 illustrates a powerplant 20 for an aircraft. The aircraft may be an airplane, a helicopter, a drone (e.g., an unmanned aerial vehicle (UAV)) or any other manned or unmanned aerial vehicle or system. The powerplant 20 may be configured as, or otherwise included as part of, a propulsion system for the aircraft. The powerplant 20 may also or alternatively be configured as, or otherwise included as part of, an electrical power system for the aircraft. The present disclosure, however, is not limited to aircraft applications. The powerplant 20, for example, may alternatively be configured as, or otherwise included as part of, an electrical power system for ground-based operation (e.g., an industrial powerplant), for aquatic operation, or otherwise. However, for ease of description, the powerplant 20 is described below as an aircraft powerplant.

The aircraft powerplant 20 of FIG. 1 includes a mechanical load 22 and a core 24 of a gas turbine engine 26, where the engine core 24 is configured to power operation of the mechanical load 22. The aircraft powerplant 20 also includes a fuel system 28 for the turbine engine 26 and its engine core 24.

The mechanical load 22 may be configured as or otherwise include a rotor 30 mechanically driven by the engine core 24. This driven rotor 30 may be a bladed propulsor rotor for the aircraft propulsion system. The propulsor rotor may be a ducted propulsor rotor or an open propulsor rotor; e.g., an un-ducted propulsor rotor. For example, where the turbine engine 26 is a turbofan engine, the ducted propulsor rotor may be a fan rotor 32. Where the turbine engine 26 is a turboprop engine, the open propulsor rotor may be a propeller rotor. Where the turbine engine 26 is a turboshaft engine, the open propulsor rotor may be a rotorcraft rotor such as a helicopter main rotor or a helicopter tail rotor. Alternatively, the driven rotor 30 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary turbine engines. The turbine engine 26, for example, may alternatively be configured as a turbojet engine, a propfan engine, a pusher fan engine or any other type of turbine engine operable to power the operation of the mechanical load 22. However, for ease of description, the mechanical load 22 is described below as a fan section 34 of the turbine engine 26, and the driven rotor 30 is described below as the fan rotor 32 within the fan section 34.

The turbine engine 26 extends axially along an axis 36 from a forward, upstream end of the turbine engine 26 to an aft, downstream end of the turbine engine 26. Briefly, this axis 36 may be a centerline axis of the turbine engine 26 and its members. The axis 36 may also be a rotational axis of one or more members of the turbine engine 26 and its engine core 24 including the fan rotor 32—the driven rotor 30. The turbine engine 26 of FIG. 1 includes the fan section 34, a compressor section 38, a combustor section 39 and a turbine section 40. The turbine section 40 of FIG. 1 includes a high pressure turbine (HPT) section 40A and a low pressure turbine (LPT) section 40B, which LPT section 40B of FIG. 1 is a power turbine (PT) section for driving rotation of the fan rotor 32.

The compressor section 38 includes a compressor rotor 42. The HPT section 40A includes a high pressure turbine (HPT) rotor 43. The LPT section 40B includes a low pressure turbine (LPT) rotor 44. The fan rotor 32, the compressor rotor 42, the HPT rotor 43 and the LPT rotor 44 each respectively include one or more arrays (e.g., stages) of rotor blades, where the rotor blades in each array are arranged circumferentially around and are connected to a respective rotor disk or hub. The rotor blades in each array, for example, may be formed integral with or mechanically fastened, welded, brazed and/or otherwise attached to the respective rotor disk and/or hub.

The compressor rotor 42 is coupled to and rotatable with the HPT rotor 43. The compressor rotor 42 of FIG. 1, for example, is connected to the HPT rotor 43 by a high speed shaft 46. At least (or only) the compressor rotor 42, the HPT rotor 43 and the high speed shaft 46 collectively form a high speed rotating assembly 48; e.g., a high speed spool of the engine core 24.

The LPT rotor 44 of FIG. 1 is connected to a low speed shaft 50. At least (or only) the LPT rotor 44 and the low speed shaft 50 collectively form a low speed rotating assembly 52; e.g., a low speed spool/a power turbine spool of the engine core 24. This low speed rotating assembly 52 is further coupled to the fan rotor 32—the driven rotor 30—through a drivetrain 54. This drivetrain 54 may be configured as a geared drivetrain, where a geartrain 56 (e.g., a transmission, a speed change device, an epicyclic geartrain, etc.) is disposed between and operatively couples the fan rotor 32 to the low speed rotating assembly 52 and its LPT rotor 44. With this arrangement, the fan rotor 32 may rotate at a different (e.g., slower) rotational velocity than the low speed rotating assembly 52 and its LPT rotor 44. However, the drivetrain 54 may alternatively be configured as a direct drive drivetrain, where the geartrain 56 is omitted. With such an arrangement, the fan rotor 32 rotates at a common (the same) rotational velocity as the low speed rotating assembly 52 and its LPT rotor 44. Referring again to FIG. 1, each of the rotating assemblies 48, 52 and its members as well as the fan rotor 32 may be rotatable about the axis 36.

The turbine engine 26 of FIG. 1 includes a (e.g., annular) core flowpath 58 and a (e.g., annular) bypass flowpath 60. Here, the bypass flowpath 60 is a ducted flowpath within the aircraft powerplant 20 and its turbine engine 26. The bypass flowpath 60, however, may alternatively be an open flowpath where the driven rotor 30 is alternatively configured as the open propulsor rotor, or the bypass flowpath 60 may be omitted where the driven rotor 30 is alternatively configured as the generator rotor. Referring again to FIG. 1, the core flowpath 58 extends within the turbine engine 26 and its engine core 24 from an airflow inlet 62 into the core flowpath 58 to a combustion products exhaust 64 from the core flowpath 58. More particularly, the core flowpath 58 extends from the core inlet 62, sequentially through the compressor section 38, the combustor section 39, the HPT section 40A and the LPT section 40B, to the core exhaust 64. The bypass flowpath 60 of FIG. 1 extends outside of the engine core 24 thereby bypassing the engine core 24 and its engine sections 38-40B.

During operation of the turbine engine 26, air is directed across the fan rotor 32 (e.g., the propulsor rotor) and into the engine core 24 through the core inlet 62. This air entering the core flowpath 58 may be referred to as core air. The core air is compressed by the compressor rotor 42 and directed into a combustion chamber 66 (e.g., an annular combustion chamber) within a combustor 68 (e.g., an annular combustor) of the combustor section 39. Fuel is injected into the combustion chamber 66 and mixed with the compressed core air to provide a fuel-air mixture. This fuel-air mixture is ignited and combustion products thereof flow through and sequentially drive rotation of the HPT rotor 43 and the LPT rotor 44. The rotation of the HPT rotor 43 drives rotation of the compressor rotor 42 and, thus, the compression of the air received from the core inlet 62. The rotation of the LPT rotor 44 drives rotation of the fan rotor 32—the driven rotor 30. The rotation of the fan rotor 32 propels some of the air flow thereacross (e.g., the air not entering the engine core 24) through the bypass flowpath 60 to provide engine thrust. Of course, where the driven rotor 30 is alternatively configured as the open propulsor rotor, the rotation of this open propulsor rotor may propel air outside of the aircraft powerplant 20 and its turbine engine 26. Where the driven rotor 30 is alternatively configured as the generator rotor, the rotation of this generator rotor may facilitate generation of electricity.

Figure 2:
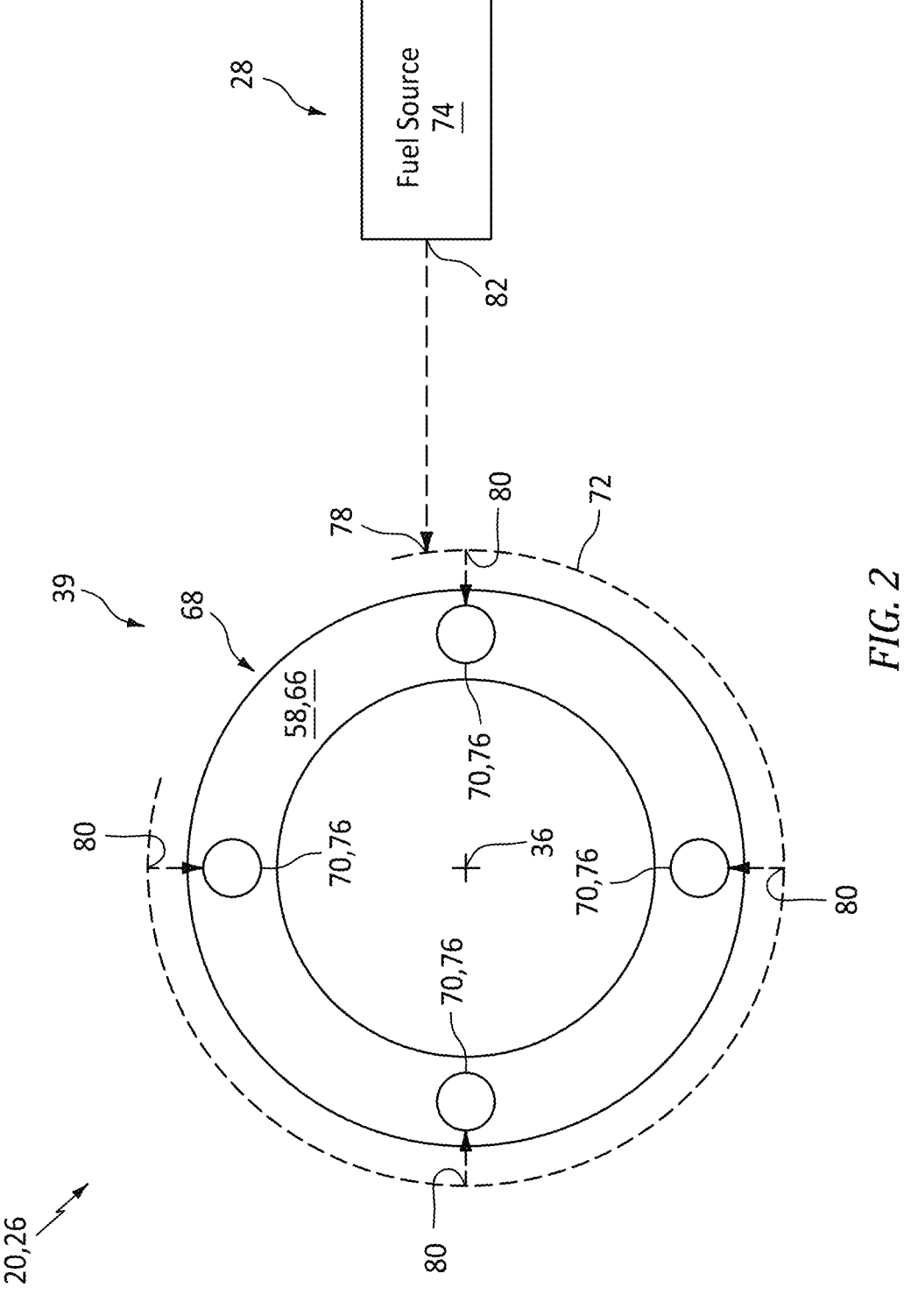
FIG. 2 is a partial schematic illustration of a fuel system with a turbine engine combustor.

Referring to FIG. 2, the fuel system 28 is configured to deliver the fuel to the combustor 68 for combustion. The fuel system 28 of FIG. 2, for example, includes the one or more fuel injectors 70, a fuel manifold 72 and a fuel source 74.

The fuel injectors 70 of FIG. 2 are arranged and may be equispaced circumferentially about the axis 36 in an annular array; e.g., a circular array. Each of these fuel injectors 70 is configured to inject the fuel into the combustion chamber 66. Each of the fuel injectors 70, for example, may include a fuel nozzle 76 which projects partially into the combustion chamber 66 to a tip of the fuel nozzle 76. Alternatively, the fuel nozzle 76 and its nozzle tip may be arranged upstream of the combustion chamber 66, but in fluid communication with the combustion chamber 66 through, for example, a bore of an air swirler assembly or the like.

The fuel manifold 72 of FIG. 2 extends circumferentially about (e.g., partially or completely around) the axis 36. This fuel manifold 72 fluidly couples the fuel source 74 to the fuel injectors 70. The fuel manifold 72 of FIG. 2, for example, includes an inlet 78 into the fuel manifold 72 and one or more outlets 80 from the fuel manifold 72 (here, one manifold outlet 80 for each fuel injector 70). The manifold inlet 78 is downstream of and fluidly coupled with an outlet 82 from the fuel source 74. Each manifold outlet 80 is upstream of and is fluidly coupled to an inlet of a respective one of the fuel injectors 70.

Figure 3:
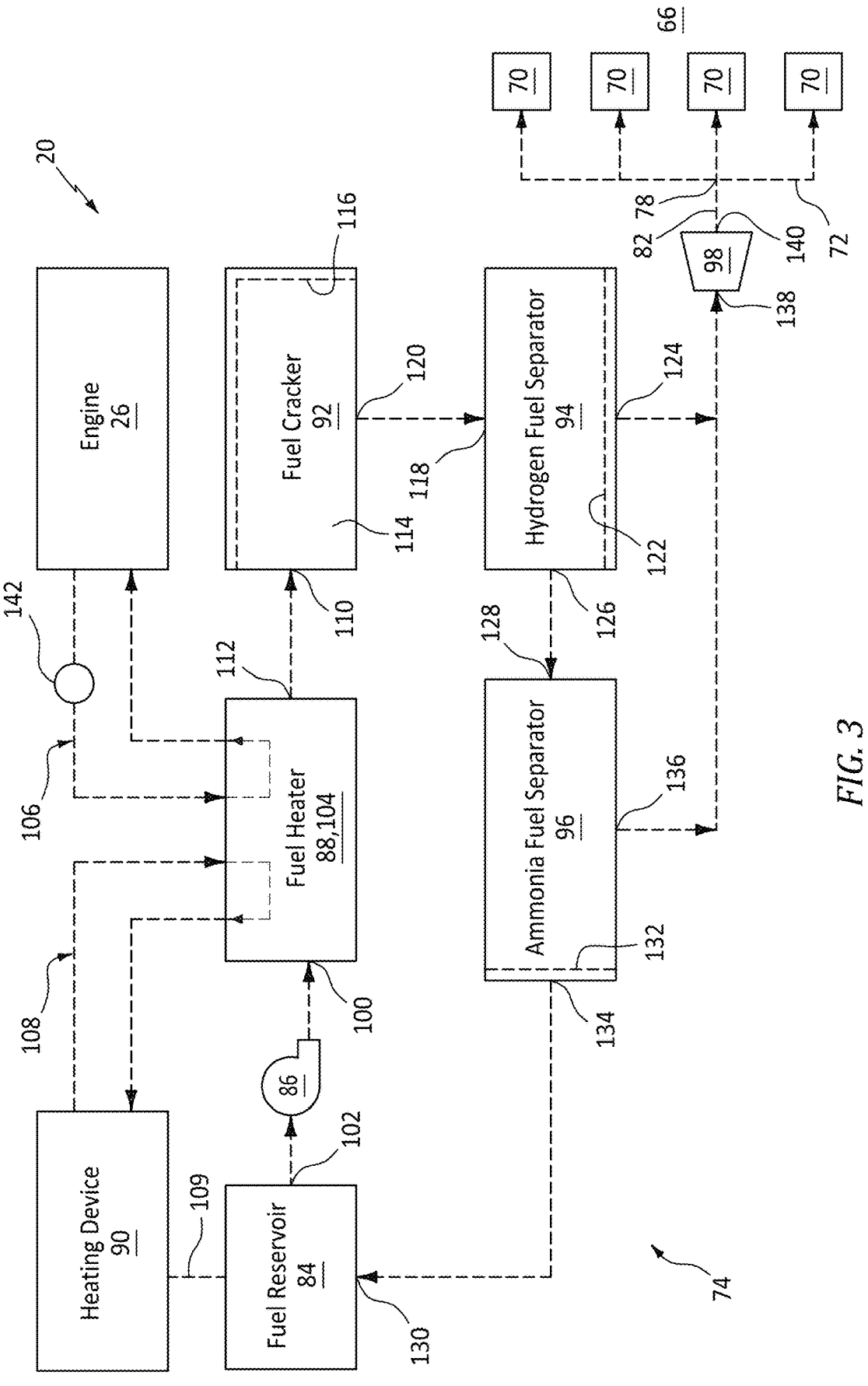
FIG. 3 is a schematic illustration of the fuel system with the turbine engine depicting details of a fuel source.

Referring to FIG. 3, the fuel source 74 is configured to output a flow of the fuel to the fuel manifold 72 and, thus, the fuel injectors 70. This fuel output by the fuel source 74 is a non-hydrocarbon fuel, and may be substantially or completely in a gaseous phase. The fuel output from the fuel source 74 may thereby be a gaseous non-hydrocarbon fuel. The fuel, for example, may be/(e.g., substantially or only) include hydrogen gas; e.g., $H_2$ gas. Alternatively, the fuel may include the hydrogen gas along with nitrogen gas; e.g., a mixture of $H_2$ gas and $N_2$ gas. The fuel source 74 of FIG. 3 includes a fuel reservoir 84 (e.g., an ammonia reservoir), a fuel pump 86, a fuel heater 88, a heating device 90, a fuel cracker 92 and one or more fuel separators 94 and 96. This fuel source 74 may also include a fuel compressor 98; e.g., a fuel pressure boosting device.

The fuel reservoir 84 may be configured as or otherwise includes a container such as, but not limited to, a tank, a cylinder, a pressure vessel or a bladder. This fuel reservoir 84 is configured to contain, hold and store a quantity of ammonia ($NH_3$). The ammonia stored within the fuel reservoir 84 may be substantially or completely in a liquid phase; e.g., liquid ammonia.

An inlet 100 into the fuel heater 88 is downstream from and is fluidly coupled to an outlet 102 from the fuel reservoir 84 through the fuel pump 86. This fuel heater 88 is configured to heat the liquid ammonia output from the fuel reservoir 84 partially or completely into a gaseous phase. The fuel heater 88, for example, may vaporize some or all of the liquid ammonia received from the fuel reservoir 84 via the fuel pump 86 into gaseous ammonia; e.g., $NH_3$ gas.

The fuel heater 88 of FIG. 3 is configured as or may otherwise include a fluid-to-fluid heat exchanger 104 thermally coupled to the turbine engine 26 and the heating device 90. This heat exchanger 104 is configured to receive heat energy generated by operation of the turbine engine 26 and/or heat energy generated by the heating device 90, and transfer some or all of that heat energy into the ammonia to heat and vaporize the ammonia.

The fuel heater 88 and its heat exchanger 104 of FIG. 3 are thermally coupled to the turbine engine 26 through an engine working fluid circuit 106. Through this engine working fluid circuit 106, the heat exchanger 104 may receive a heated working fluid (e.g., a heat transfer fluid) from the turbine engine 26 of FIG. 1. This working fluid may be compressed core air bled from the core flowpath 58 along or downstream of the compressor section 38. Alternatively, the working fluid may be combustion products bled from the core flowpath 58 along or downstream of the combustor 68 and, more particularly, along or downstream of the turbine section 40. Alternatively, the working fluid may be a fluid used for cooling one or more components of the turbine engine 26 following the cooling of the respective engine component(s); e.g., now heated cooling air, heated lubricant, heated fuel, etc. Still alternatively, the working fluid may be an intermediate fluid which draws heat energy out of one or more components of the turbine engine 26 during cooling and/or lubricating the respective engine component(s); e.g., lubricant, coolant, etc. The present disclosure, however, is not limited to such exemplary working fluids nor to such exemplary heat sources for generating the heat energy within the turbine engine 26.

The fuel heater 88 and its heat exchanger 104 of FIG. 3 are thermally coupled to the heating device 90 through a heater working fluid circuit 108. Through this heater working fluid circuit 108, the heat exchanger 104 may receive another heated working fluid (e.g., a heat transfer fluid) from the heating device 90. This working fluid may be a heat transfer liquid or a heat transfer gas. Examples of the heat transfer liquid include water, lubricant (e.g., oil) and coolant (e.g., glycol). An example of the heat transfer gas is air. The present disclosure, however, is not limited to such exemplary working fluids.

The heating device 90 is configured to heat the working fluid provided to the heat exchanger 104 through the heater working fluid circuit 108. Operation of the heating device 90 of FIG. 3 is independent of the operation of the turbine engine 26. The heating device 90, for example, may be configured as an electric heating device powered by an electrical power source. The power source may be an electrical system onboard the aircraft, one or more batteries onboard the aircraft, a ground-based electrical grid discrete from the aircraft, or the like. In another example, the heating device 90 may be configured as a fuel powered heating device. The heating device 90, for example, may include an internal burner which burns additional fuel to heat the working fluid provided to the heat exchanger 104. The fuel burnt by the heating device 90 may be a hydrocarbon fuel or a non-hydrocarbon fuel. Examples of the hydrocarbon fuel include, but are not limited to, sustainable aviation fuel (SAF), kerosene, natural gas, propane, or another aviation fuel. Examples of the sustainable aviation fuel include fuels produced using material(s) such as, but not limited to, corn grain, oil seeds, algae, fats, oils, greases, agricultural residue, forestry residue, wood mill waste, municipal solid waste streams, wet wastes (e.g., manure, wastewater treatment sludge, etc.) and dedicated energy crops. Examples of the non-hydrocarbon fuel include, but are not limited to, ammonia, hydrogen fuel or the like. Where the fuel burnt by the heating device 90 is ammonia, this ammonia may (or may not) be received from the fuel reservoir 84 (e.g., see optional connection 109).

Figures 4, 5:
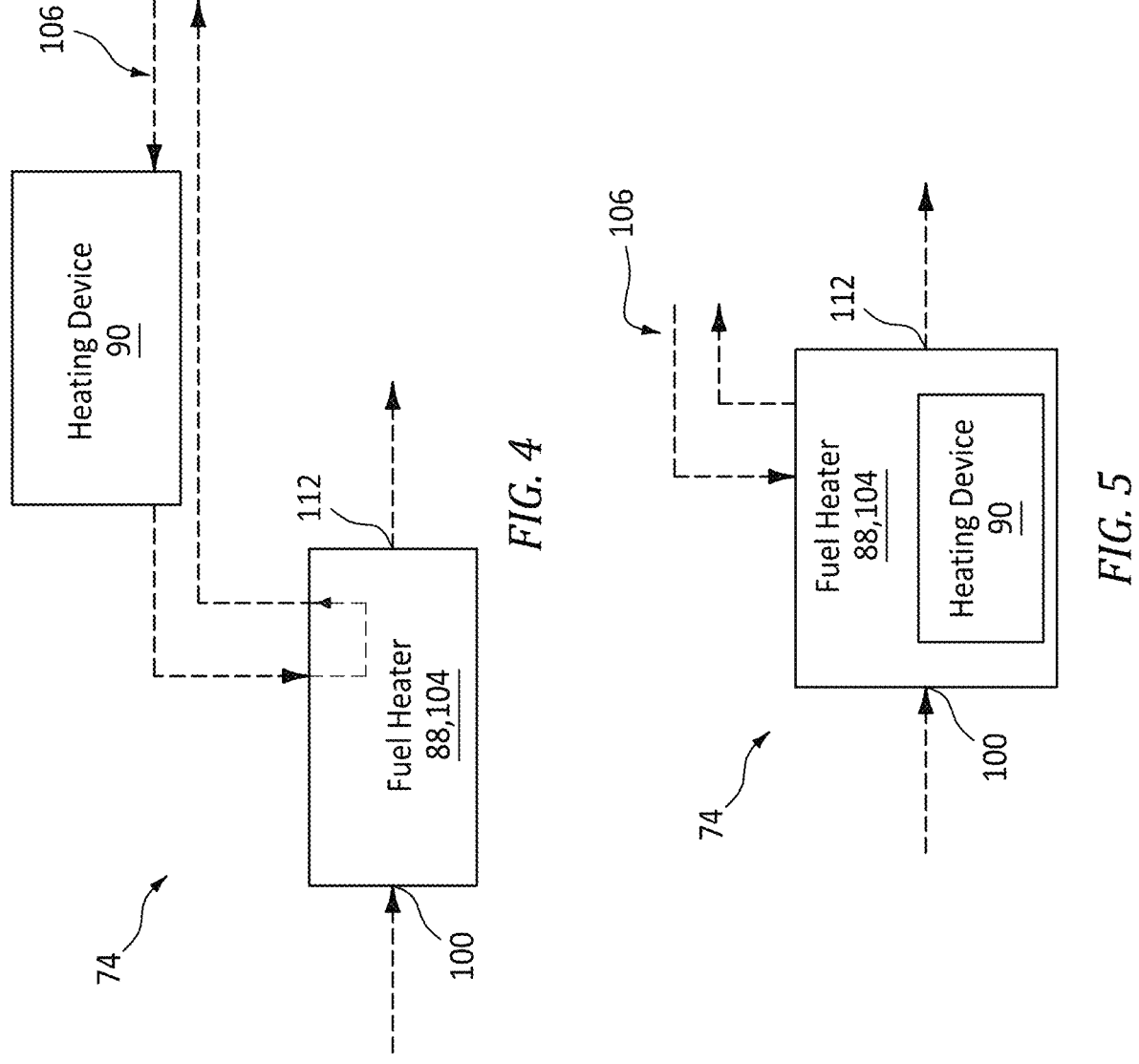
FIGS. 4 and 5 are partial schematic illustrations of the fuel source with various alternative arrangements for its heating device.

While the heat exchanger 104 of FIG. 3 receives different heated working fluids from the turbine engine 26 and the heating device 90, the present disclosure is not limited to such an exemplary arrangement. For example, referring to FIG. 4, the heating device 90 may alternatively be configured to heat the same working fluid as heated by the turbine engine 26. The heating device 90 of FIG. 4, for example, is fluidly coupled (e.g., serially) inline along the engine working fluid circuit 106. Moreover, while the heating device 90 of FIGS. 3 and 4 is thermally coupled to the heat exchanger 104 through the respective working fluid circuit 108, 106, the present disclosure is not limited to such arrangements. For example, referring to FIG. 5, the heating device 90 may alternatively be configured integral with (e.g., a part of and/or disposed within) the fuel heater 88 and its heat exchanger 104.

Referring to FIG. 3, an inlet 110 into the fuel cracker 92 is downstream from and is fluidly coupled to an outlet 112 from the fuel heater 88. This fuel cracker 92 is configured to facilitate at least partial or complete cracking (e.g., decomposition) of the ammonia (e.g., the gaseous ammonia) received from the fuel heater 88 into the hydrogen gas and the nitrogen gas. A passage 114 through the fuel cracker 92, for example, may be at least partially or completely lined, coated and/or otherwise formed by at least one catalyst 116. The passage 114 may also or alternatively be partially filled with a porous catalyst-containing material such as pellets or honeycomb. Examples of the catalyst 116 include, but are not limited to, nickel (Ni), iron (Fe), ruthenium (Ru), platinum (Pt) or an alloy including any one or more of the foregoing metals. The ammonia gas may thereby flow along, contact and interact with the catalyst 116 as it flows in the fuel cracker 92 and its passage 114, where the interaction between the ammonia gas and the catalyst 116 facilitates at least partial or complete cracking of the ammonia gas into the hydrogen gas and the nitrogen gas. While the fuel cracker 92 is shown in FIG. 3 as a separate element from the fuel heater 88, it is contemplated the fuel heater 88 and the fuel cracker 92 may alternatively be combined into a single device. Alternatively, it is contemplated the fuel cracker 92 may also be a heater configured to further heat the ammonia during the cracking process.

An inlet 118 into the hydrogen fuel separator 94 is downstream from and is fluidly coupled to an outlet 120 from the fuel cracker 92 (or an outlet from a combination fuel heater/fuel cracker). This hydrogen fuel separator 94 is configured to separate the at least partially (or completely) cracked ammonia into two or more groupings. For example, following the partial cracking of the ammonia via the fuel cracker 92, the hydrogen fuel separator 94 may receive the (remaining/uncracked) ammonia gas, the hydrogen gas and the nitrogen gas. The hydrogen fuel separator 94 may separate these components into two groupings. The first grouping may be/(e.g., substantially or only) include the hydrogen gas. The second grouping may be/(e.g., substantially or only) include a mixture of the (remaining/uncracked) ammonia gas and the nitrogen gas. However, it is contemplated the first grouping may alternatively further include the nitrogen gas, and the second grouping may be (e.g., substantially or only) the remaining uncracked ammonia gas.

To separate the at least partially (or completely) cracked ammonia into the first and the second groupings, the hydrogen fuel separator 94 may include a hydrogen permeable membrane 122. This hydrogen permeable membrane 122 is configured to separate at least some of the first group (e.g., the hydrogen gas) from the second group (e.g., the nitrogen gas and any remaining ammonia gas). The hydrogen permeable membrane 122 may be constructed from or otherwise include one or more Group V metals such as palladium (Pd), alloys of palladium with other metals such as silver (Ag) or copper (Cu), or one or more other materials with high permeability of hydrogen gas as compared to ammonia gas and nitrogen gas.

A first outlet 124 from the hydrogen fuel separator 94 is upstream of and is fluidly coupled to the outlet 82 from the fuel source 74/the manifold inlet 78. This first outlet 124 from the hydrogen fuel separator 94 directs the separated hydrogen gas to the outlet 82 from the fuel source 74/the manifold inlet 78. A second outlet 126 from the hydrogen fuel separator 94 is upstream of and fluidly coupled to an inlet 128 into the ammonia fuel separator 96. This second outlet 126 from the hydrogen fuel separator 94 directs the remaining nitrogen gas and/or ammonia gas to the inlet 128 of the ammonia fuel separator 96. Alternatively, it is contemplated the first outlet 124 from the hydrogen fuel separator 94 may be the outlet 82 from the fuel source 74 where, for example, the ammonia fuel separator 96 is omitted. In such embodiments, the second outlet 126 from the hydrogen fuel separator 94 may alternatively be upstream of and fluidly coupled to a return 130 (e.g., an inlet) into the fuel reservoir 84.

The ammonia fuel separator 96 is configured to separate any remaining ammonia gas from the nitrogen gas. The ammonia fuel separator 96, for example, may include an ammonia permeable membrane 132. This ammonia permeable membrane 132 is configured to separate at least some of the remaining ammonia gas from the nitrogen gas. The ammonia permeable membrane 132 may be formed from one or more polymers, zeolites, or other materials with high permeability of ammonia gas as compared to hydrogen gas or nitrogen gas.

A first outlet 134 from the ammonia fuel separator 96 is upstream of and is fluidly coupled to the return 130 of the fuel reservoir 84. This first outlet 134 from the ammonia fuel separator 96 directs the separated ammonia gas back to the fuel reservoir 84 for storage and then reuse. A second outlet 136 from the ammonia fuel separator 96 is upstream of and is fluidly coupled to the outlet 82 from the fuel source 74. The outlet 82 from the fuel source 74 may thereby be configured to output a combination of the hydrogen gas and the nitrogen gas from the fuel source 74. Alternatively, it is contemplated the nitrogen gas may be routed elsewhere for storage and/or alternative use.

The compressor 98 is configured to increase a pressure of the fuel flowing to the outlet 82 from the fuel source 74/the manifold inlet 78. The compressor 98 of FIG. 3 is fluidly coupled (e.g., serially) inline between (a) the hydrogen fuel separator 94 and/or the ammonia fuel separator 96 and (b) the outlet 82 from the fuel source 74/the manifold inlet 78. An inlet 138 into the compressor 98 of FIG. 3, for example, is fluidly coupled with and is downstream of the first outlet 124 from the hydrogen fuel separator 94 and/or the second outlet 136 from the ammonia fuel separator 96. An outlet 140 from the compressor 98 is fluidly coupled with and is upstream of (or may be) the outlet 82 of the fuel source 74.

The fuel system 28 may operate in various modes of operation. These operating modes may include a startup operating mode and a post-startup operating mode (or modes). During the startup operating mode, the fuel system 28 is operated to facilitate startup of the turbine engine 26 of FIG. 1. For example, prior to turbine engine operation, the turbine engine 26 may not generate any of the heat energy used for cracking the ammonia gas into the hydrogen gas and the nitrogen gas. Moreover, during the initial startup of the turbine engine 26, the turbine engine 26 may not generate enough of the heat energy for cracking the ammonia gas into the hydrogen gas and the nitrogen gas. Therefore, during the startup operating mode, the heating device 90 may be operated (e.g., turned on) to generate substantially all or all of the heat energy for heating and vaporizing the ammonia. During at least an initial portion or an entirety of this startup operating mode, little or none of the heat energy used for heating and vaporizing the ammonia may be received from the turbine engine 26. For example, a control valve 142 fluidly coupled inline along the engine working fluid circuit 106 may be closed so as to prevent (or substantially reduce) the working fluid flow from the turbine engine 26 to the fuel heater 88 and its heat exchanger 104. By contrast, during normal steady-state and/or transient-state operation of the turbine engine 26, the turbine engine 26 may generate more than enough of the heat energy to facilitate the heating and vaporization of the ammonia. The control valve 142 may thereby be opened to permit heated working fluid to flow from the turbine engine 26 to the fuel heater 88 and its heat exchanger 104. During at least one, some or all of the post-startup operating mode(s), little or none of the heat energy used for heating and vaporizing the ammonia may be received from the heating device 90. The heating device 90, for example, may be non-operation (e.g., turned off) during the respective post-startup operating mode(s). Of course, in other embodiments, it is contemplated the heating device 90 may alternatively be utilized to provide boosted/supplemental heating during one or more of the post-startup operating mode(s).

The fuel system 28 may be configured with various types of internal combustion engines. The fuel system 28, for example, may be configured with a gas turbine engine as described above. While the turbine engine 26 is described above with two rotating structures (e.g., two spools), it is contemplated the turbine engine 26 may alternatively be configured with a single rotating structure or more than two rotating structures. Moreover, it is contemplated the fuel system 28 may alternatively be configured with various other types of internal combustion engines such as, but not limited to, a rotary engine (e.g., a Wankel engine), a reciprocating piston engine, etc. The present disclosure therefore is not limited to any particular type of internal combustion engine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure.

Accordingly, the present disclosure is not to be restricted except in light of the attached claims and their equivalents.

What is claimed is:

1. A powerplant, comprising:
a turbine engine including a flowpath, a compressor section, a combustor section and a turbine section, the flowpath extending through the compressor section, the combustor section and the turbine section from an inlet into the flowpath to an exhaust from the flowpath, and the combustor section comprising a combustor with a combustion chamber; and
a fuel system including a reservoir, a heat exchanger, a heating device, a cracker and a fuel injector, the heat exchanger configured to vaporize a first flow of liquid ammonia received from the reservoir into ammonia gas using heat energy, the heat exchanger configured to receive the heat energy from the heating device during a first operating mode, the heat exchanger configured to receive the heat energy from the turbine engine during a second operating mode, the cracker configured to at least partially crack the ammonia gas into hydrogen gas and nitrogen gas, and the fuel system configured to deliver the hydrogen gas or a combination of the hydrogen gas and the nitrogen gas to the fuel injector for injection into the combustion chamber;
wherein the first operating mode is associated with initial startup operation of the turbine engine;
wherein the second operating mode is associated with post-startup operation of the turbine engine; and
wherein the turbine engine is thermally coupled to the heat exchanger through a first heat transfer fluid, and further comprising a control valve configured to:
close to prevent a flow of the first heat transfer fluid from the turbine engine to the heat exchanger in the first operating mode; and
open to permit the flow of the first heat transfer fluid from the turbine engine to the heat exchanger in the second operating mode;
wherein the heating device is thermally coupled to the heat exchanger through a second heat transfer fluid, and the second heat transfer fluid comprises a heat transfer liquid.

2. The powerplant of claim 1, wherein the heating device comprises an electric heating device.

3. The powerplant of claim 1, wherein the heating device is configured to burn fuel to generate the heat energy during the first operating mode.

4. The powerplant of claim 3, wherein the fuel is a hydrocarbon fuel.

5. The powerplant of claim 3, wherein the fuel is a non-hydrocarbon fuel.

6. The powerplant of claim 3, wherein the fuel comprises a second flow of the liquid ammonia received from the reservoir.

7. The powerplant of claim 1, wherein the second heat transfer fluid is different than the first heat transfer fluid.

8. The powerplant of claim 1, wherein the fuel system further comprises a first separator configured to separate uncracked ammonia from the hydrogen gas downstream of the cracker.

9. The powerplant of claim 8, wherein the fuel system further comprises a second separator configured to separate the uncracked ammonia from the nitrogen gas downstream of the first separator.

10. The powerplant of claim 1, wherein the fuel system further comprises a compressor configured to compress the hydrogen gas and/or the nitrogen gas delivered to the fuel injector.

11. The powerplant of claim 1, wherein the fuel system is configured to deliver the hydrogen gas to the fuel injector for injection into the combustion chamber.

12. The powerplant of claim 1, wherein the fuel system is configured to deliver the combination of the hydrogen gas and the nitrogen gas to the fuel injector for injection into the combustion chamber.

* * * * *